United States Patent
Atkins

(10) Patent No.: US 10,046,785 B2
(45) Date of Patent: Aug. 14, 2018

(54) METHODS AND APPARATUS FOR CHILD TRANSPORT COVER

(71) Applicant: Moshe Atkins, Henderson, NV (US)

(72) Inventor: Moshe Atkins, Henderson, NV (US)

(*) Notice: Subject to any disclaimer, the term of this patent is extended or adjusted under 35 U.S.C. 154(b) by 0 days.

(21) Appl. No.: 15/273,195

(22) Filed: Sep. 22, 2016

(65) Prior Publication Data

US 2017/0080967 A1 Mar. 23, 2017

Related U.S. Application Data

(60) Provisional application No. 62/221,933, filed on Sep. 22, 2015.

(51) Int. Cl.
*B62B 9/14* (2006.01)
*B62B 9/26* (2006.01)
*B62B 7/06* (2006.01)

(52) U.S. Cl.
CPC ............... *B62B 9/142* (2013.01); *B62B 9/26* (2013.01); *B62B 7/06* (2013.01)

(58) Field of Classification Search
CPC .. B62B 9/12; B62B 9/14; B62B 9/142; B62B 9/145; B62B 9/147; B62B 7/06
USPC .............................. 280/1.22, 1.23, 1.13, 1.16
See application file for complete search history.

(56) References Cited

U.S. PATENT DOCUMENTS

| | | | | |
|---|---|---|---|---|
| 2,775,462 A | * | 12/1956 | Biasell | A63H 33/00 280/827 |
| 2,791,434 A | * | 5/1957 | Wheeler | A63H 7/04 280/1.204 |
| 5,125,712 A | * | 6/1992 | Stamoutsos | B62B 9/00 280/1.13 |
| 5,184,865 A | * | 2/1993 | Mohtasham | B62B 9/142 135/133 |
| 5,265,912 A | * | 11/1993 | Natividad | A63F 9/06 280/62 |
| 5,542,732 A | * | 8/1996 | Pollman | B62B 9/142 296/77.1 |
| 5,758,889 A | * | 6/1998 | Ledakis | B62B 9/14 280/47.38 |
| 5,785,340 A | * | 7/1998 | Dias | A61G 5/1054 280/1.23 |
| 5,975,558 A | * | 11/1999 | Sittu | B62B 9/142 280/47.38 |
| 5,975,613 A | * | 11/1999 | Sippel | B62B 9/145 296/77.1 |
| 6,019,421 A | | 2/2000 | Roh | |

(Continued)

FOREIGN PATENT DOCUMENTS

BG  207408 A  11/1923
NL  2002137  4/2010

*Primary Examiner* — Jacob B Meyer
(74) *Attorney, Agent, or Firm* — The Noblitt Group, PLLC

(57) ABSTRACT

Methods and apparatus for a child transport cover according to various aspects of the present invention may operate in conjunction with a child transport, such as a stroller, and a flexible outer cover coupled to a structural system. The structural system may comprise a main frame disposed on an interior portion of a cover. The main frame may comprise a rigid support portion and a flexible support portion, as well as a plurality of fasteners coupled to the main frame. Each fastener may comprise a mechanism adapted to secure the fastener to the child transport device.

16 Claims, 10 Drawing Sheets

(56) References Cited

U.S. PATENT DOCUMENTS

| | | | |
|---|---|---|---|
| 6,032,972 A * | 3/2000 | Dias | A61G 5/1054 280/1.13 |
| 6,039,393 A | 3/2000 | Roh | |
| 6,068,322 A * | 5/2000 | Kuester | B62B 9/142 296/97.21 |
| 6,217,099 B1 * | 4/2001 | McKinney | B62B 9/142 160/89 |
| 6,224,073 B1 * | 5/2001 | Au | B62B 9/142 280/47.38 |
| D462,221 S | 9/2002 | Brewer | |
| 6,513,817 B2 * | 2/2003 | McCue | B62B 3/144 280/33.993 |
| 6,908,148 B2 | 6/2005 | Wang et al. | |
| 6,979,004 B2 * | 12/2005 | Otterlee | B62B 3/14 280/33.992 |
| 7,017,937 B2 * | 3/2006 | Williams | B60N 2/2848 280/30 |
| 7,052,085 B2 * | 5/2006 | Hoey-Slocombe | A47G 9/068 297/219.12 |
| 7,213,878 B2 * | 5/2007 | Delapaz | B62B 9/142 297/184.1 |
| 7,284,790 B1 | 10/2007 | Brewer | |
| 7,832,757 B2 * | 11/2010 | McCabe | B62B 9/00 280/650 |
| 8,287,038 B2 * | 10/2012 | Henderson | B62B 9/142 280/47.38 |
| 8,360,498 B1 * | 1/2013 | Ostad | B60R 7/08 224/409 |
| 9,463,821 B1 * | 10/2016 | Critchley | B62B 9/10 |
| 2004/0164507 A1 * | 8/2004 | Otterlee | B62B 3/14 280/33.993 |
| 2004/0164508 A1 * | 8/2004 | Otterlee | B62B 3/14 280/33.993 |
| 2004/0244301 A1 | 12/2004 | Dickson et al. | |
| 2004/0245812 A1 | 12/2004 | Wang et al. | |
| 2005/0168006 A1 * | 8/2005 | Darland | B62B 9/14 296/97.21 |
| 2005/0275257 A1 | 12/2005 | McGregor | |
| 2006/0012138 A1 * | 1/2006 | Otterlee | B62B 3/144 280/33.993 |
| 2007/0080519 A1 * | 4/2007 | Murdock | A61G 5/00 280/650 |
| 2009/0096257 A1 * | 4/2009 | Gordon | B62B 9/142 297/184.12 |
| 2010/0038939 A1 | 2/2010 | Kim | |
| 2011/0089674 A1 * | 4/2011 | Berman | B62B 9/12 280/827 |
| 2013/0292962 A1 * | 11/2013 | Romanow | B60J 7/104 296/107.02 |
| 2014/0230747 A1 * | 8/2014 | Jakubowski | B62B 9/14 119/496 |
| 2015/0096603 A1 | 4/2015 | Nadel | |
| 2016/0304110 A1 * | 10/2016 | Critchley | B62B 9/10 |

* cited by examiner

METHODS AND APPARATUS FOR CHILD TRANSPORT COVER

CROSS-REFERENCE TO RELATED APPLICATION

This application claims the benefit of U.S. Provisional Patent Application Ser. No. 62/221,933, filed on Sep. 22, 2015, and incorporates the disclosure of the application in its entirety by reference. To the extent that the present disclosure conflicts with any referenced application, however, the present disclosure is to be given priority.

BACKGROUND OF THE TECHNOLOGY

Conventional covers used on infant carriers, strollers, and the like provide a drape or a protective cover specifically designed for a particular brand or model. The drape covers are baggy and ill-fitting, while the life-span of the model-specific covers is short due to the child outgrowing the baby carrier and/or stroller.

In addition, the conventional covers must be removed from the stroller to collapse the stroller for storage or transport. Removing the cover may require an unacceptable amount of time due to the great number of fasteners used to secure the cover to the stroller.

SUMMARY OF THE INVENTION

Methods and apparatus for a child transport cover according to various aspects of the present invention may operate in conjunction with a child transport, such as a stroller, and a flexible outer cover coupled to a structural system. The structural system may comprise a main frame disposed on an interior portion of a cover. The main frame may comprise a rigid support portion and a flexible support portion, as well as a plurality of fasteners coupled to the main frame. Each fastener may comprise a mechanism adapted to secure the fastener to the child transport device.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of fabrics, connectors, couplings, tubing, wiring, and the like, which may carry out a variety of functions. In addition, the present technology may be practiced in conjunction with any number of applications, and the apparatus described is merely one exemplary application for the technology. Further, the present technology may employ any number of conventional techniques for fastening, providing structure, attachment mechanisms, and the like, and may employ any number of materials.

An apparatus according to various aspects of the present technology may be used in conjunction with any suitable transport, such as for carrying children or babies. Various representative implementations of the present technology may be applied, for example, to any suitable wagon, stroller, baby walker, baby carriage, buggy, or carriage. Alternative embodiments may be applicable to non-wheeled transport systems, such as slings and backpacks for carrying babies and/or larger children.

Figure 1:
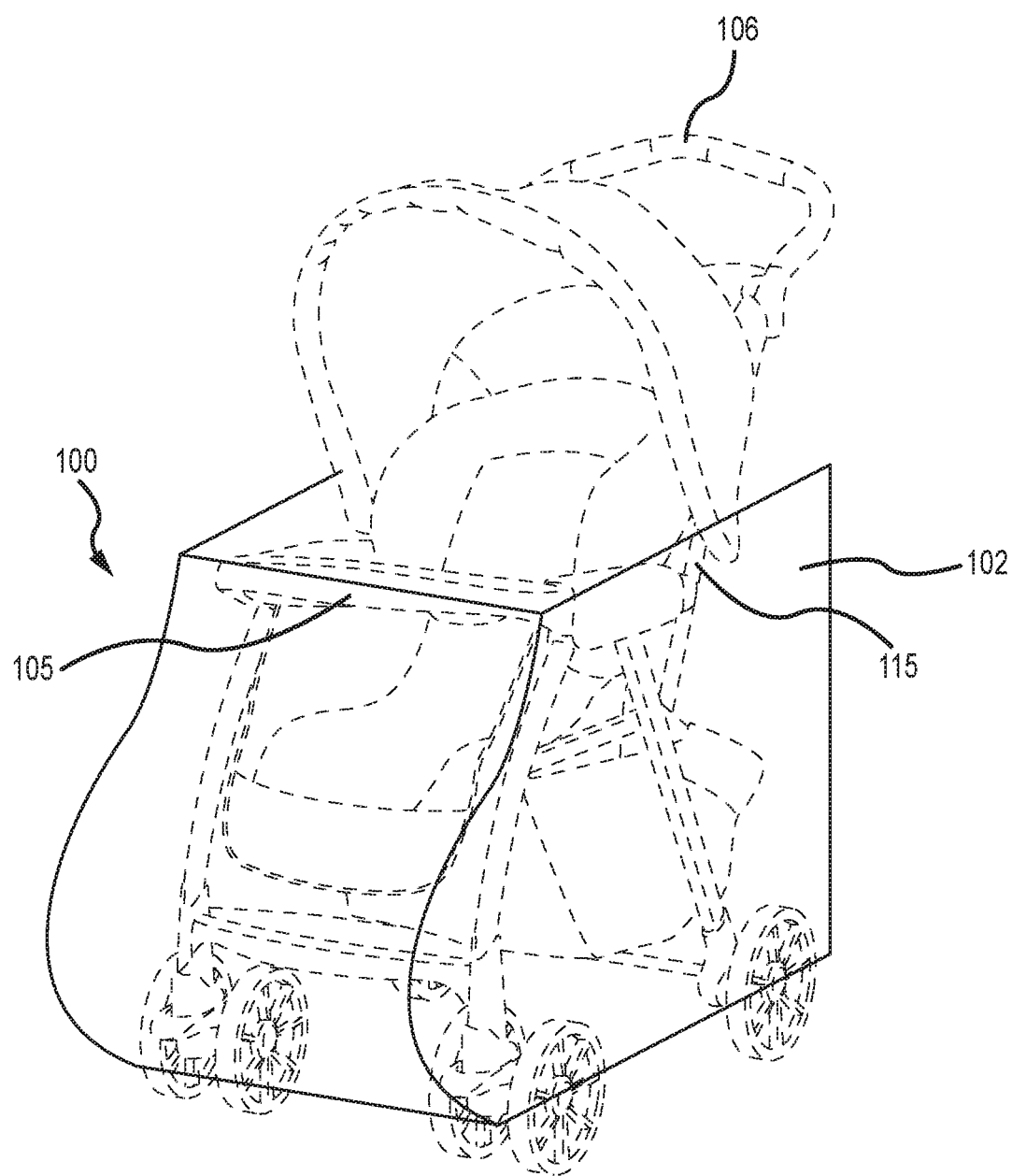
FIG. 1 representatively illustrates a child transport cover in accordance with an exemplary embodiment of the present technology.

Referring to FIGS. 1 and 2, in various embodiments of the present technology, a costume cover 100 may secure to a stroller 106, baby carriage, buggy, carriage, baby walker, or other child transport device. According to various embodiments, the costume cover 100 may comprise an outer cover 102 decorated to provide a child-friendly themed design.

In various embodiments, the costume cover 100 attaches to a frame of a stroller 106 and may be adapted to fit a stroller of any shape or size. For example, the costume cover 100 may be adapted to fit to various styles and sizes of strollers, such as standard-size strollers, car seat stroller frames, travel strollers, umbrella strollers, double or triple strollers, and jogging strollers. In various embodiments, the costume cover 100 may extend to accommodate larger stroller styles. For example, the costume cover 100 may comprise excess outer cover 102 fabric and/or a stretchable material. Conversely, the costume cover 100 may be adapted to contract to accommodate smaller stroller styles. For example, excess outer cover 102 may be configured to fold and be equipped with fasteners to secure the outer cover 102. For example, fasteners such as touch fasteners, pins, buttons, snaps, slide fasteners, buckles, zippers, hooks and eyes, elastic, ties, and the like or any combination thereof may be used to secure excess fabric and hold the costume cover 100 in place to inhibit shifting or bunching.

The outer cover 102 may be constructed of any suitable material, such as cotton, polyester, blended fabrics, plastic, cardboard, or leather, and may comprise any suitable embellishments, such as beading, glitter, sequins, rhinestones, decals, lettering, decorative shapes, logos, lighting (such as LEDs), and cartoon characters. In various embodiments, the outer cover 102 may be decorated with embellishments to create a themed accessory. For example, and referring to FIGS. 2A-D, the outer cover 102 may apparently transform the stroller 106 into a car (FIG. 2C), a train (FIG. 2B), a princess carriage (FIG. 2D), an animal (FIG. 2A), or any other suitable theme.

Figure 3:
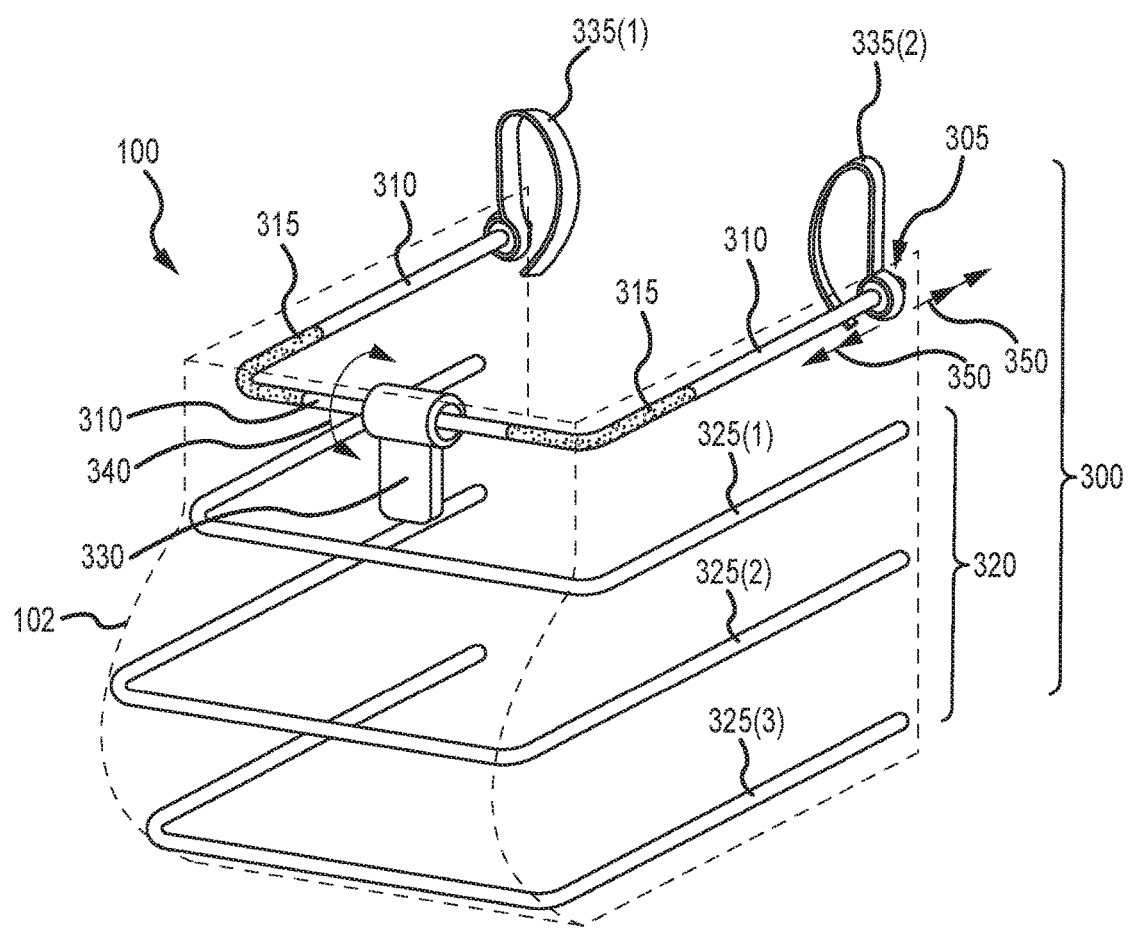
FIG. 3 representatively illustrates a child transport cover in accordance with an exemplary embodiment of the present technology.

Referring to FIG. 3, the costume cover 100 may further comprise a structural system 300 coupled to the outer cover 102 to provide structure, shape, and/or support to the outer cover 102. In various embodiments, the costume cover 100 may be configured to fold and collapse upon removal from the stroller 106 for ease of transport and storage. As such, the structural system 300 may comprise flexible portions that flex and fold. For example, portions of the structural system 300 may be made of thin plastics and wire, or any other suitable materials that are capable of folding yet are able to provide support to the outer cover 102 when in use.

In various embodiments, the structural system 300 may be disposed on an interior portion of the outer cover 102 and substantially hidden from view when the costume cover 100 is secured to the stroller 106. The structural system 300 may be constructed of any suitable material to provide support and structure to the outer cover 102, such as tubing, boning, wire, connectors, couplings, and the like or any combination thereof. In various embodiments, the structural system 300 is affixed to the outer cover 102 to prevent shifting and bunching of the outer cover 102. For example, the structural system 300 may be affixed to the outer cover 102 using an attachment mechanism, such as touch fasteners, pins, buttons, snaps, slide fasteners, buckles, zippers, hooks and eyes, ties, any combination thereof, or any other suitable fastener. Alternatively, the structural system 300 may be disposed within a channel integrated in the interior portion of the outer cover 102. For example, the channel may be sewn into the interior portion of the outer cover 102 to create a pocket to insert a rigid material, such as tubing and/or boning.

In various embodiments, the structural system 300 is adaptable to accommodate various stroller styles. The structural system 300 may comprise built-in extenders to accommodate various sized strollers, for example extendable tubing that may be lengthened or shortened to accommodate a particular size stroller.

In various embodiments, the structural system 300 may comprise a main frame 305 disposed on an interior portion of the outer cover 102. The main frame 305 may comprise a rigid support member 310, such as plastic tubing, to provide structure to an upper portion of the costume cover 100. The main frame 305 may further comprise a flexible region 315 disposed along a curved edge of the main frame 305 to provide flexible support to accommodate various strollers with varying widths. The flexible region 315 may comprise a flexible and/or bendable material, such as rubber tubing.

In various embodiments, the main frame 305 is configured to correspond to the shape of the stroller 106, such as a periphery of the stroller 106. For example, the main frame 305 may comprise a length ranging from 20 to 30 inches, corresponding to side portions of the stroller 106, and a width ranging from 18 to 24 inches, corresponding to a front portion of the stroller 106. In various embodiments, the main frame 305 is substantially U-shaped to surround the front portion and side portions of the stroller 106.

In various embodiments, the structural system 300 may comprise a secondary frame 320 disposed on an interior portion of the outer cover 102. The secondary frame 320 may comprise one or more secondary support members 325. The secondary support member 325 may comprise a rigid material and/or a flexible material, for example tubing, boning, wire, elastic, and the like.

In an exemplary embodiment, the secondary frame 320 comprises a plurality of vertically stacked secondary support members 325(1), 325(2), 325(3). The secondary frame 320 may comprise vertically aligned and/or tiered secondary support members 325. Each of the support members 325(1), 325(2), 325(3) may be separate and independent from the others. In other words, the support members 325(1), 325(2), 325(3) are connected to each other only by the outer cover 102. In additional, the support members 325(1), 325(2), 325(3) may be stackable and/or nestable, to allow the outer cover 102 to collapse.

Figure 2A:
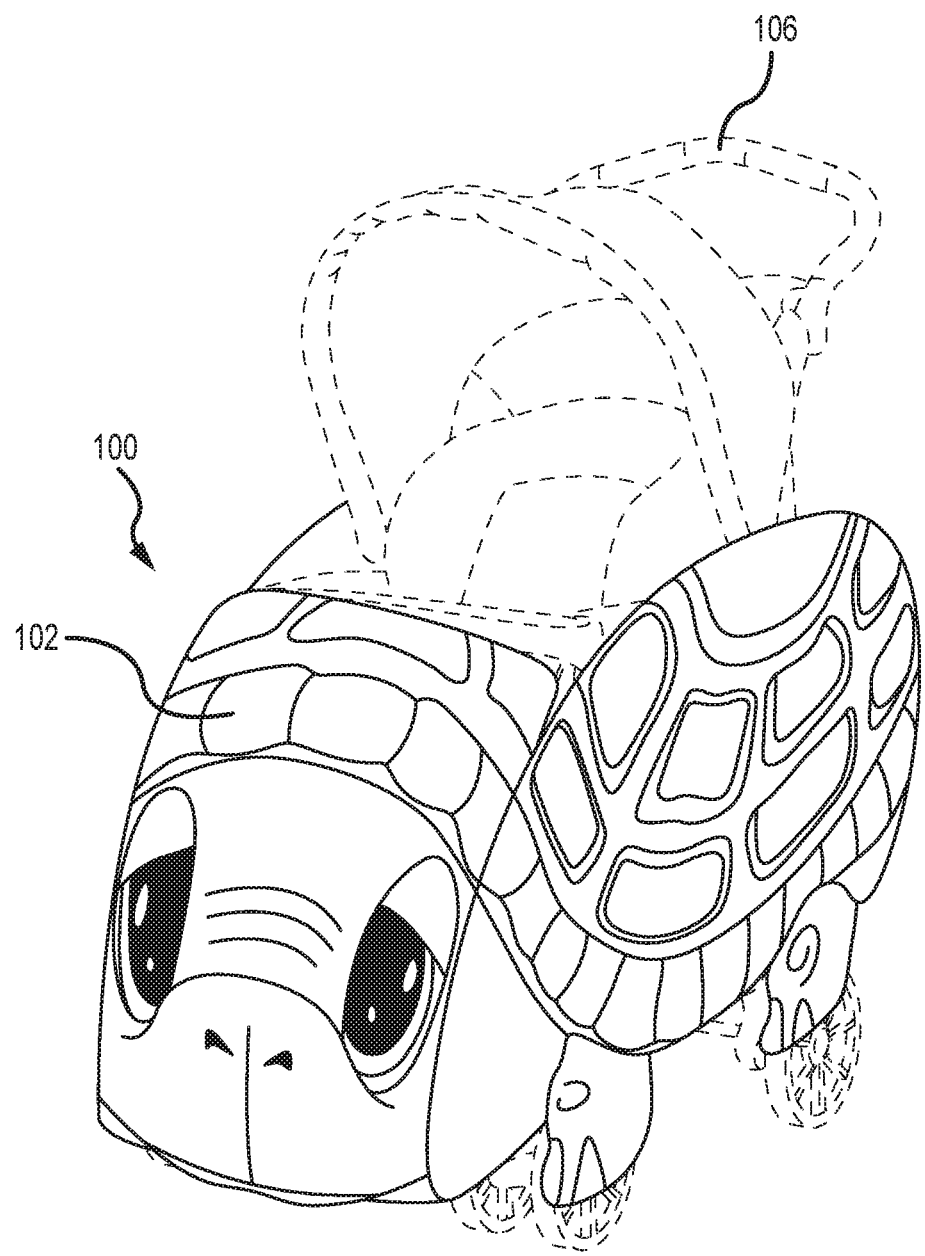
FIGS. 2A-2D representatively illustrate various child transport cover designs in accordance with exemplary embodiments of the present technology.
Figure 2B:
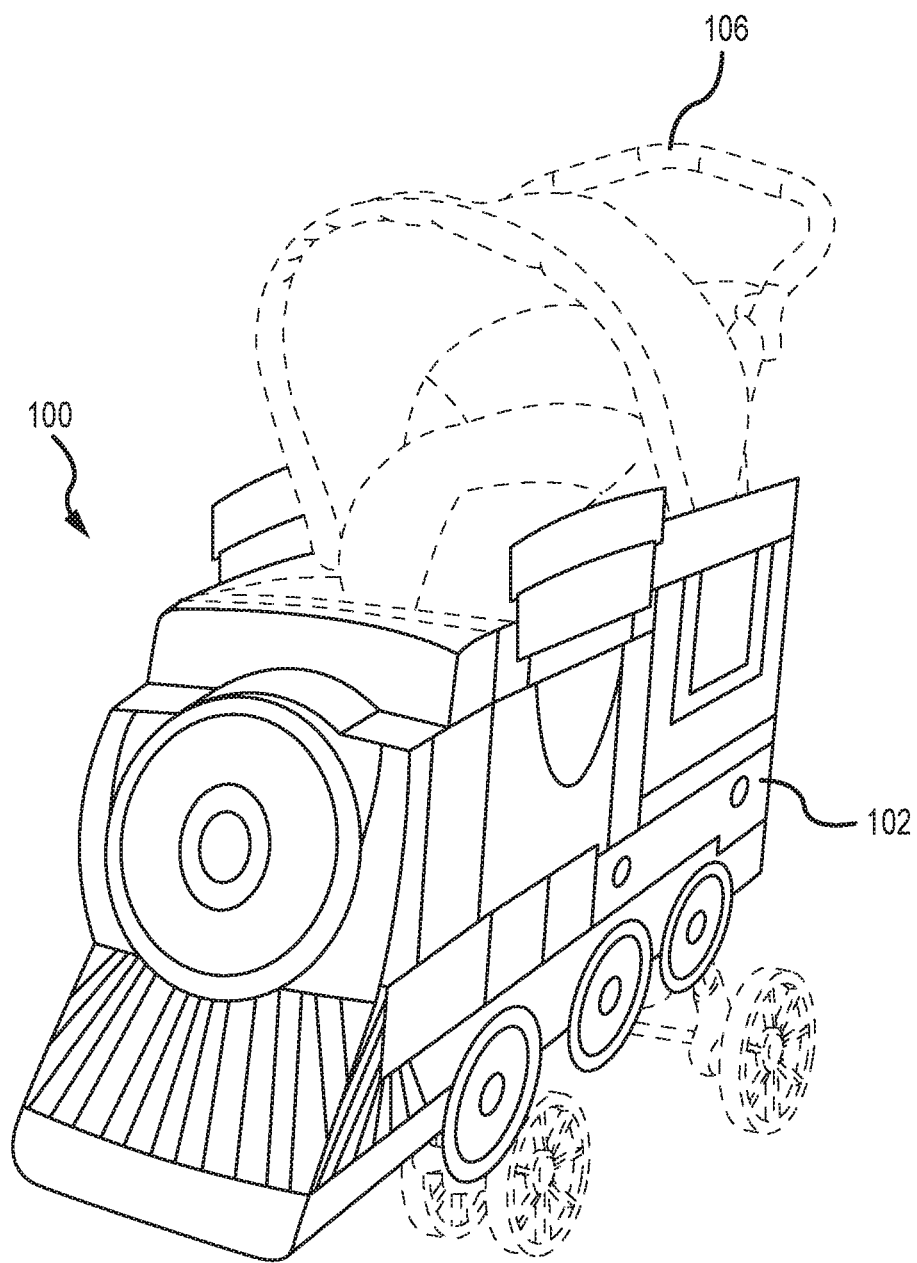
Figure 2C:
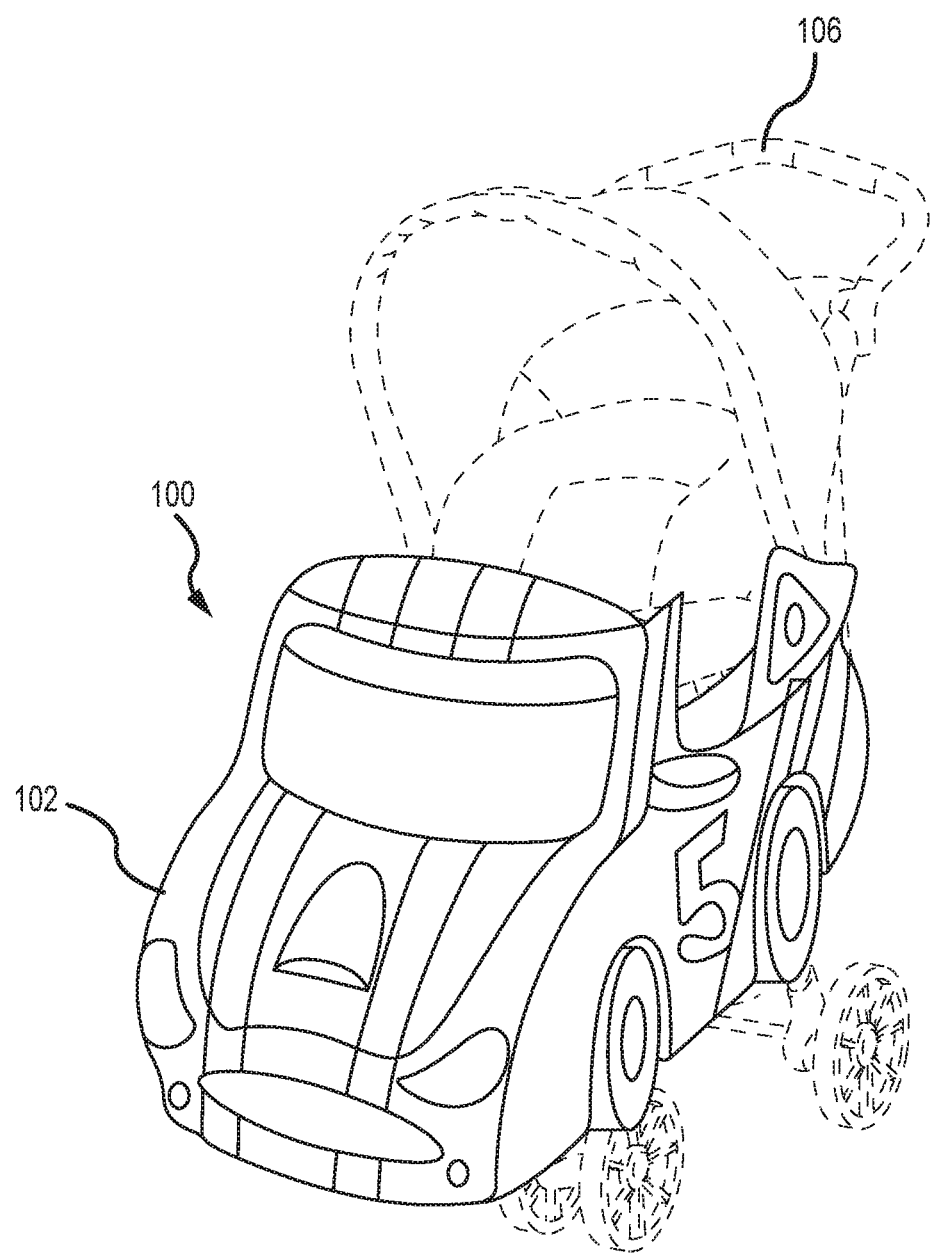
Figure 2D:
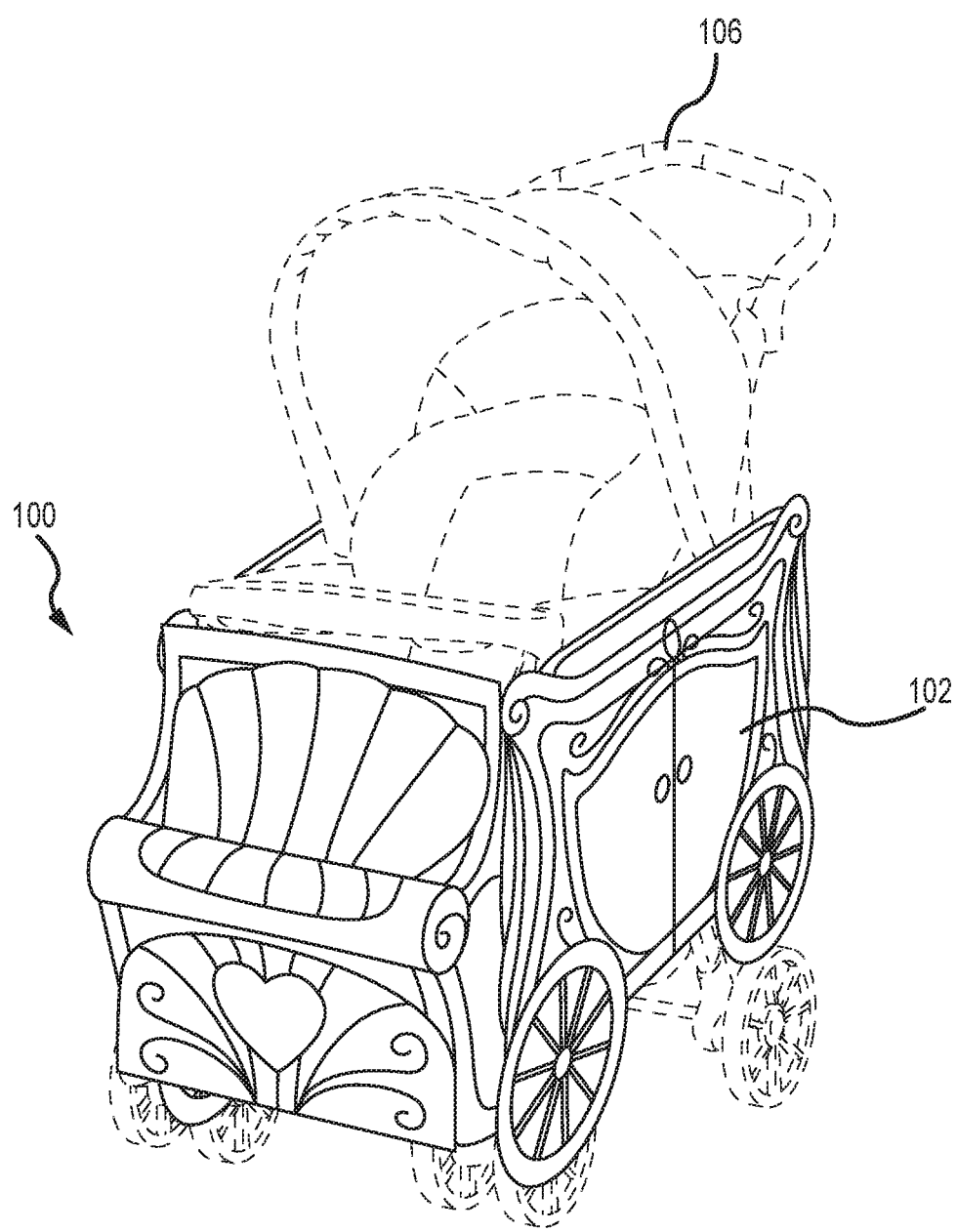

The secondary frame 320 may comprise any suitable shape and size may be selected to complement the particular design of the outer cover 102. For example, the shape and size of the secondary frame 320 may comprise a substantially rounded support member 325 to portray the shape of an animal, for example as illustrated in FIG. 2A. Alternatively, the secondary frame 320 may comprise a substantially square support member 325 to portray the shape of a train, for example as illustrated in FIG. 2B.

The costume cover 100 may comprise a fastening mechanism to secure the costume cover 100 to the stroller 106 to maintain a desired positioning of the costume cover 100. In various embodiments, the costume cover 100 may comprise various fastening mechanisms to provide various points of contact with the stroller 106 to maintain a particular orientation and prevent the outer cover 102 from shifting, bunching, or falling down. For example, the costume cover 100 may make contact with the stroller 106, via the fastening mechanism, near the handles, along the side frame of the stroller 106, and/or along the front portion of the stroller 106, such as a tray or a safety bar. In various embodiments, the fastening mechanism may comprise any suitable fastener, such as touch fasteners, pins, buttons, snaps, slide fasteners, buckles, claps, zip ties, zippers, hooks and eyes, ties, and the like, or any combination thereof.

Figure 4A:
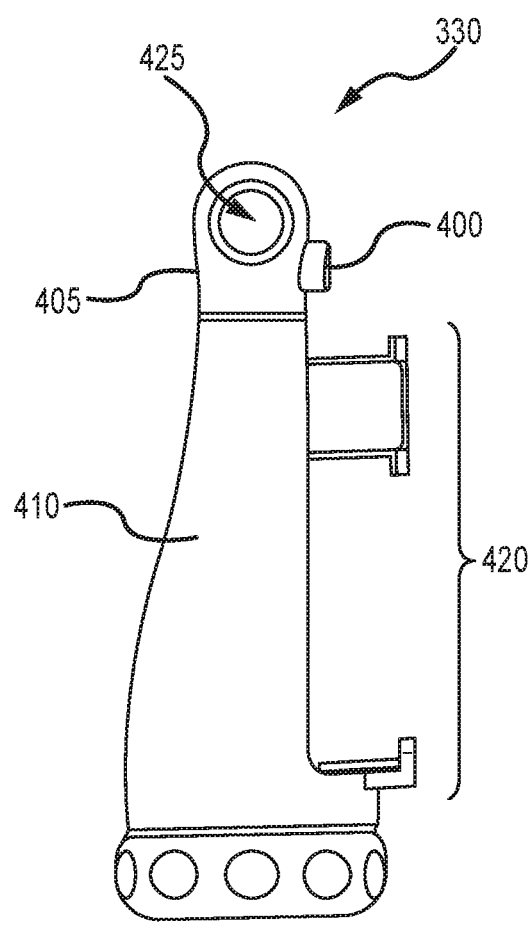
FIGS. 4A-4B representatively illustrate a fastener in accordance with an exemplary embodiment of the present technology.
Figure 4B:
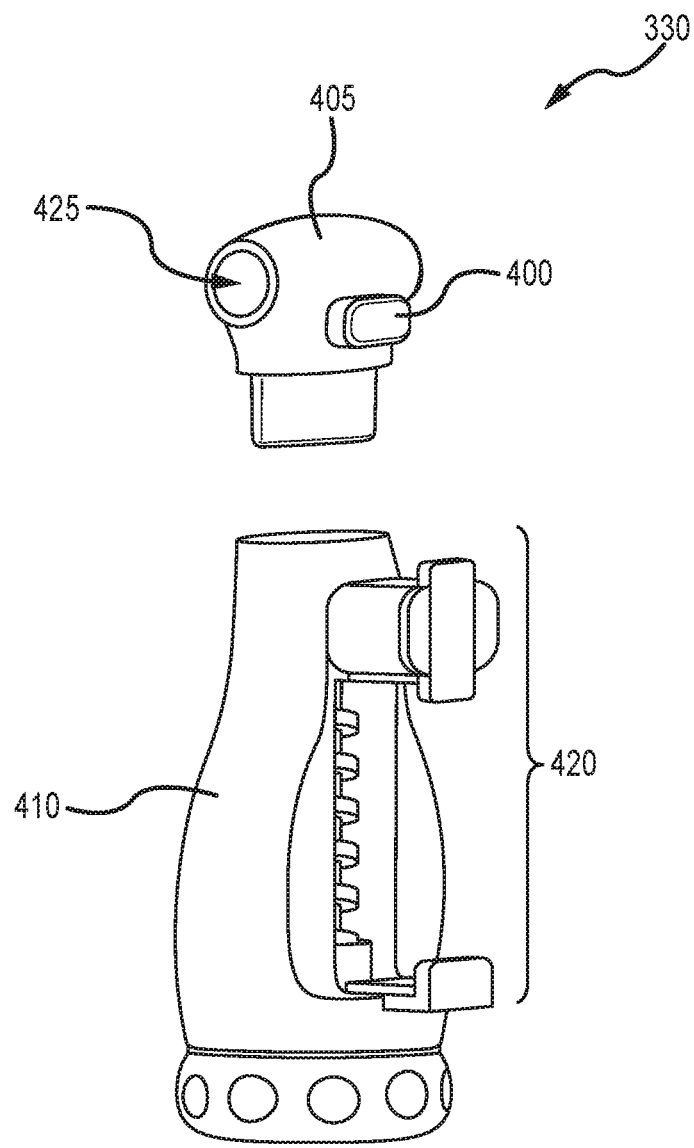

The costume cover 100 may comprise a front fastener to couple the main frame 305 to the stroller 106. For example, referring to FIGS. 3 and 4A-B, in various embodiments, an exemplary front fastener 330 may be disposed along the front of the main frame 305 between the flexible members 315. In an exemplary embodiment, the front fastener 330 may comprise a top portion 405 and a bottom portion 410.

The top portion 405 may attach to the main frame 305. In an exemplary embodiment, the top portion 405 comprises a through-hole 425 to accommodate the rigid support member 310 of the main frame 305, such that the rigid support member 310 can be inserted into the through-hole 425.

In various embodiments, the front fastener 330 may be movably coupled to the main frame 300 to change the position of the front fastener 330. In an exemplary embodiment, the top portion 405 of the front fastener 330 may be configured to rotate 340 about the main frame 305 via the through-hole 425, such that the front fastener 330 may be positioned at any angle of rotation between zero and 360 degrees to adjust to various stroller models, sizes, and styles. In general, the front fastener 330 is perpendicular to the main frame 300.

The bottom portion 410 may be configured to attach to a bar or a tray 105 (FIG. 1) of the stroller 106. For example, the front fastener 330 may comprise an adjustable clamp 420, strap, or any other suitable adjustable mechanism that can be tightened or loosened. The adjustable mechanism may also allow the front fastener 330 to disconnect from the stroller 106. If the stroller 106 is not equipped with a bar or a tray 105, an additional support bar (not shown) may be affixed to the stroller 106 to provide an attachment point for the front fastener 330.

In various embodiments, the front fastener 330 may be configured to separate into multiple elements to facilitate folding and/or collapsing the costume cover 100. For example, the front fastener 330 may comprise a release mechanism 400 to separate the top portion 405 from the bottom portion 410.

Figure 5:
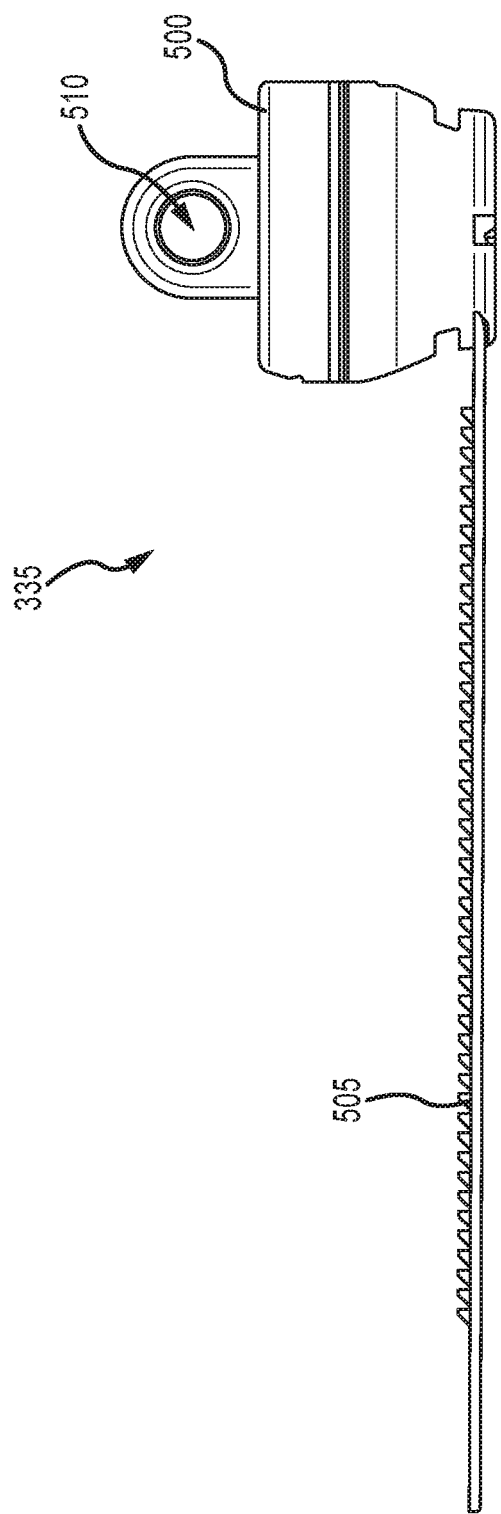
FIG. 5 representatively illustrates a fastener in accordance with an exemplary embodiment of the present technology.

The costume cover 100 may comprise a side fastener 335 to couple the main frame 305 to the stroller 106. For example, referring to FIGS. 3 and 5, in various embodiments, the side fastener 330 may be disposed along the rigid support members 310 of the main frame 305 to secure the costume cover 100 to a frame portion of the stroller 106. In an exemplary embodiment, the side fastener 330 may comprise a body 500 and an adjustable mechanism 505.

The body 500 may be configured to attach to the main frame 305. In an exemplary embodiment, the body 500 comprises a through-hole 510 to accommodate the rigid support member 310 of the main frame 305, such that the rigid support member 310 can be inserted into the through-hole 510.

In various embodiments, the side fastener 335 may be movably coupled to the main frame 300 to change the position of the side fastener 335 relative to the main frame 300. In an exemplary embodiment, the body 500 of the side fastener 335 may be configured to slide 350 along the main frame 305 via the through-hole 510, such that the side fastener 335 may be positioned at any point along the support member 310 to adjust to various stroller models, sizes, and styles.

The adjustable mechanism 505 may be configured to attach to a side frame portion 115 (FIG. 1) of the stroller 106. For example, the adjustable mechanism 505 may comprise an adjustable strap, ties, or any other suitable mechanism that can be tightened or loosened. The adjustable mechanism 505 may also allow the side fastener 335 to disconnect from the stroller 106.

Figure 6:
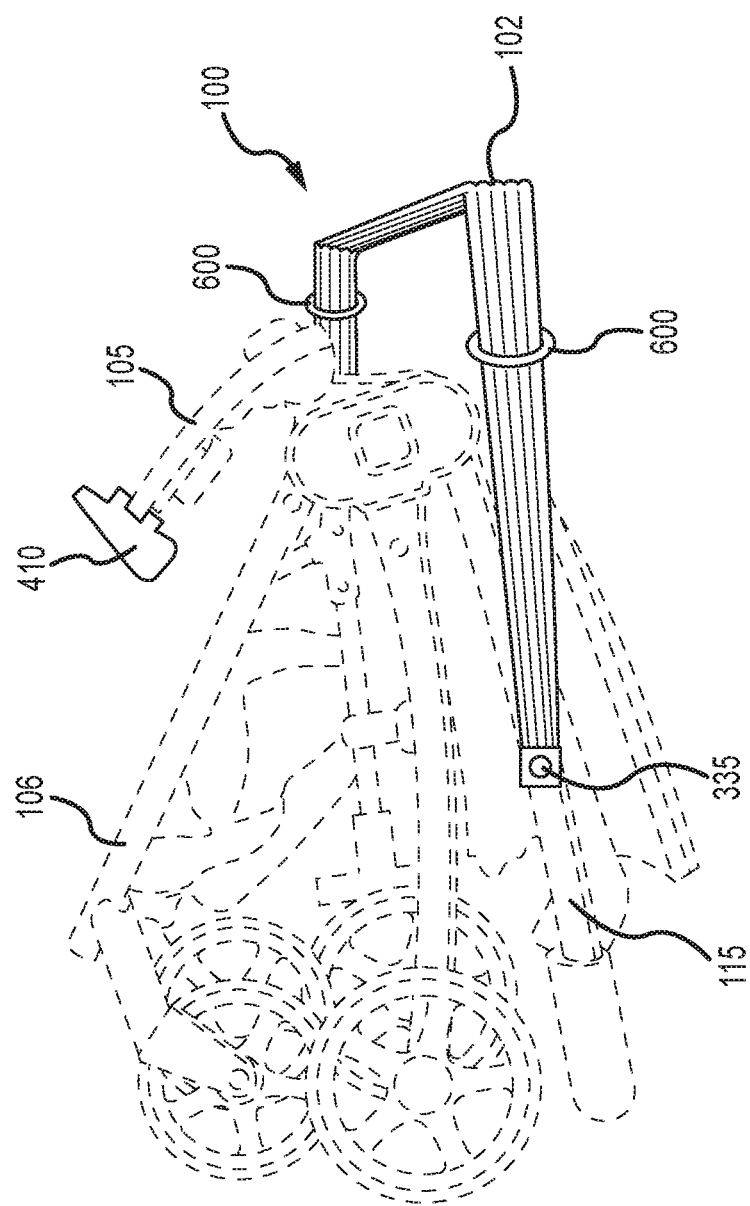
FIG. 6 representatively illustrates a folded child transport cover in accordance with an exemplary embodiment of the present technology.

In various embodiments, the costume cover 100 may be configured to fold and collapse with the stroller 106 while still being attached to the stroller 106 for ease of transport and storage. For example, referring to FIG. 6, an exemplary costume cover 100 comprises flexible portions, such as a flexible and/or foldable outer cover 102, and other components, such as the structural system 300, that flex, fold, nest, collapse, and/or the like.

In various embodiments, a portion of the costume cover 100 may disconnect from the stroller to allow the stroller 106 to fold. In an exemplary embodiment, the top portion 405 of front fastener 330 may be separated from the bottom portion 410 of the front fastener 330 via the release mechanism 400 to allow the stroller 106 to fold freely while unencumbered by the costume cover 100. The top portion 405 may remain coupled to the main frame 305 while the bottom portion 410 may remain coupled to the stroller 106. The side fasteners 335(1), 335(2) may remain attached to the side frame portion 115 of the stroller 106. As such, once the stroller 106 is in the folded position, the costume cover 100 may be secured in a folded and/or collapsed state. The folded costume cover 100 may be secured using any suitable fastener 600, such as touch fasteners, pins, buttons, snaps, slide fasteners, buckles, claps, zip ties, zippers, hooks and eyes, ties, and the like, or any combination thereof.

The particular implementations shown and described are illustrative of the technology and its best mode and are not intended to otherwise limit the scope of the present technology in any way. Indeed, for the sake of brevity, conventional manufacturing, connection, preparation, and other functional aspects of the apparatus may not be described in detail. Furthermore, the connecters and points of contact shown in the various figures are intended to represent exemplary physical relationships between the various elements. Many alternative or additional functional relationships or physical connections may be present in a practical system.

In the foregoing description, the technology has been described with reference to specific exemplary embodiments. Various modifications and changes may be made, however, without departing from the scope of the present technology as set forth. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology.

The invention claimed is:

1. An apparatus for use with a child transport device having a front portion and opposing side portions, comprising:
 a flexible outer cover;
 a main frame disposed on an interior portion of the cover, the main frame comprising a substantially U-shaped rigid support member extending across the front portion and rearwardly along the opposing side portions, wherein the main frame is shaped to correspond to the front and side portions of the child transport device;
 a secondary frame comprising a plurality of vertically stacked support members disposed on the interior portion of the cover, wherein each support member is separated from the other support members;

a first fastener coupled to the main frame, wherein the first fastener comprises a first mechanism adapted to secure the first fastener to the front portion of the child transport device; and a second fastener coupled to the main frame, wherein the second fastener comprises a second mechanism adapted to secure the second fastener to the side portions of the child transport device.

2. The apparatus of claim 1, further comprising a third fastener coupled to the main frame, wherein the third fastener is opposite that of the second fastener.

3. The apparatus of claim 1, further comprising a flexible region disposed along a curved edge of the main frame.

4. The apparatus of claim 1, wherein the main and secondary frames are independent from one another.

5. The apparatus of claim 4, wherein the main frame and secondary frame are configured to collapse onto one another while remaining secured to the child transport device.

6. The apparatus of claim 1, wherein the first and second mechanisms comprise at least one of a clamp and a strap.

7. A decorative stroller cover, comprising:
a flexible outer cover;
a structural system comprising:
   a main frame disposed on an interior portion of the cover, the main frame comprising a rigid support member and a flexible support member, wherein the main frame extends across a front and along each side of the interior portion of the outer cover and is shaped to correspond to the periphery of the stroller, and
   a secondary frame comprising a plurality of vertically stacked support members disposed below the main frame and on the interior portion of the cover, wherein each support member is separated from the other support members;
a first fastener comprising:
   a first portion comprising a through-hole pivotably coupled to the main frame, and
   a second portion comprising an adjustable clamp to secure the first fastener to a front portion of the stroller; and
a second and third fastener, each of the second and third fastener comprising:
   a through-hole slidably coupled to the main frame, and
   an adjustable mechanism to secure the second and third fasteners to opposing side portions of the stroller.

8. The stroller cover of claim 7, wherein the main frame is substantially U-shaped.

9. The stroller cover of claim 8, wherein the flexible support member is disposed along a curved edge of the main frame.

10. The stroller cover of claim 7, wherein each support is independent from the other supports.

11. The stroller cover of claim 7, wherein the main and secondary frames are independent from one another.

12. The stroller cover of claim 7, wherein the main frame and secondary frame are configured to collapse onto one another.

13. The stroller cover of claim 7, the first fastener further comprising a release mechanism to separate the first portion from the second portion.

14. An apparatus for use with a child transport device, comprising:
a flexible outer cover;
a structural system comprising:
   a main frame, disposed on an interior portion of the cover and shaped to correspond to the periphery of the child transport device, comprising a rigid support portion and a flexible support portion; wherein the main frame extends across a front and along each side of the interior portion of the cover; and
   a secondary frame comprising a plurality of vertically stacked support members disposed below the main frame, wherein each support member:
      is coupled to the interior portion of the cover;
      is independent from the other supports; and
      is independent from the main frame; and
a plurality of fasteners coupled to the main frame, each fastener comprising:
   a mechanism adapted to secure each fastener to the child transport device.

15. The apparatus of claim 14, wherein the main frame and the plurality of vertically stacked support members are configured to collapse onto one another.

16. The apparatus of claim 14, wherein the mechanism comprises at least one of an adjustable strap and an adjustable clamp.

* * * * *